US010618425B2

(12) United States Patent
de Hesselle et al.

(10) Patent No.: US 10,618,425 B2
(45) Date of Patent: Apr. 14, 2020

(54) HIGH VOLTAGE BATTERY PACK MOUNTING SYSTEMS FOR ELECTRIFIED VEHICLES

(71) Applicant: FORD GLOBAL TECHNOLOGIES, LLC, Dearborn, MI (US)

(72) Inventors: Eric de Hesselle, Clarkston, MI (US); Steven Michael Cyr, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/126,350

(22) Filed: Sep. 10, 2018

(65) Prior Publication Data

US 2020/0079227 A1   Mar. 12, 2020

(51) Int. Cl.
*B60K 1/04* (2019.01)
*B60L 50/64* (2019.01)
*B62D 65/02* (2006.01)

(52) U.S. Cl.
CPC .............. *B60L 50/64* (2019.02); *B60K 1/04* (2013.01); *B62D 65/024* (2013.01); *B60K 2001/0438* (2013.01)

(58) Field of Classification Search
CPC ... B60K 6/28; B60K 2001/0438; B60K 21/11
USPC ..................................... 180/299, 300, 68.5
See application file for complete search history.

(56) References Cited

U.S. PATENT DOCUMENTS

| | | | |
|---|---|---|---|
| 6,435,297 B1* | 8/2002 | Barber | B60G 21/0551 180/291 |
| 6,460,662 B2* | 10/2002 | Niaura | F16F 9/365 188/267.1 |
| 7,771,865 B2* | 8/2010 | Takasaki | B60K 1/04 429/71 |
| 7,997,368 B2* | 8/2011 | Takasaki | B60K 1/04 180/68.5 |
| 8,002,063 B2 | 8/2011 | Rydberg et al. | |
| 8,079,435 B2* | 12/2011 | Takasaki | B60K 1/04 180/68.5 |
| 8,720,636 B2* | 5/2014 | Akoum | B60K 1/00 180/299 |
| 8,833,499 B2 | 9/2014 | Rawlinson | |
| 8,915,321 B2* | 12/2014 | Lejeune | B60K 1/04 180/68.5 |
| 9,033,084 B2* | 5/2015 | Joye | B60K 1/04 180/68.5 |
| 9,236,592 B2* | 1/2016 | Sundararajan | H01M 2/1077 |
| 9,630,502 B2 | 4/2017 | Chen et al. | |
| 9,884,545 B1* | 2/2018 | Addanki | B60K 1/04 |
| 9,899,648 B2 | 2/2018 | Templeman et al. | |
| 10,099,546 B2* | 10/2018 | Hara | B60L 50/66 |

(Continued)

*Primary Examiner* — Jeffrey J Restifo
(74) *Attorney, Agent, or Firm* — David B. Kelley; Carlson, Gaskey & Olds

(57) ABSTRACT

This disclosure details mounting systems and associated methods for mounting a battery pack to an electrified vehicle. An exemplary electrified vehicle may include a frame, a battery pack, and a mounting system for mounting the battery pack to the frame. The mounting system may include one or more isolator assemblies for substantially isolating the battery pack from vehicle loads that may be imparted onto the frame. Each isolator assembly may include a beam and multiple bushings mounted within the beam and connected to either the frame or the battery pack.

18 Claims, 4 Drawing Sheets

(56) References Cited

U.S. PATENT DOCUMENTS

| | | | |
|---|---|---|---|
| 10,112,470 B2 * | 10/2018 | Hamilton | B60K 1/04 |
| 10,179,609 B2 * | 1/2019 | Stenzenberger | B60K 1/04 |
| 10,272,759 B2 * | 4/2019 | Sudhindra | B60K 1/04 |
| 10,336,211 B2 * | 7/2019 | Kobayashi | H01M 2/1077 |
| 2014/0284125 A1 * | 9/2014 | Katayama | B60K 1/04 |
| | | | 180/68.5 |
| 2015/0122561 A1 | 5/2015 | Kashiwai et al. | |
| 2016/0214475 A1 | 7/2016 | Rawlinson | |
| 2016/0226041 A1 * | 8/2016 | Jackson | H01M 2/1083 |

* cited by examiner

HIGH VOLTAGE BATTERY PACK MOUNTING SYSTEMS FOR ELECTRIFIED VEHICLES

TECHNICAL FIELD

This disclosure relates generally to electrified vehicle battery packs, and more particularly to mounting systems for isolating vehicle mounted high voltage battery packs from various vehicle loads.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack may be susceptible to various vehicle loads during operation of the electrified vehicle.

SUMMARY

An electrified vehicle according to an exemplary aspect of the present disclosure includes, among other things, a frame, a battery pack, and a mounting system for mounting the battery pack to the frame. The mounting system includes an isolator assembly that includes a beam and a plurality of bushings mounted within the beam and connected to either the frame or the battery pack.

In a further non-limiting embodiment of the foregoing electrified vehicle, the frame includes a first rail, a second rail, and a cross member extending between the first rail and the second rail, and the battery pack is at least partially between the first rail and the second rail.

In a further non-limiting embodiment of either of the foregoing electrified vehicles, a bracket extends from the first rail, the second rail, or the cross member, and the isolator assembly is received by the bracket.

In a further non-limiting embodiment of any of the foregoing electrified vehicles, a fastener extends through the bracket and through one of the plurality of bushings to secure the battery pack relative to the frame.

In a further non-limiting embodiment of any of the foregoing electrified vehicles, the plurality of bushings include a first bushing, a second bushing, and a third bushing.

In a further non-limiting embodiment of any of the foregoing electrified vehicles, a first fastener extends through the first bushing and then into the frame, a second fastener extends through the second bushing and then into the battery pack, and a third fastener extends through the third bushing and then into the battery pack.

In a further non-limiting embodiment of any of the foregoing electrified vehicles, the second bushing is positioned at a first distance from the first bushing, and the third bushing is positioned at a second distance from the second bushing, and the second distance is approximately half of the first distance.

In a further non-limiting embodiment of any of the foregoing electrified vehicles, the beam is a rigid lever.

In a further non-limiting embodiment of any of the foregoing electrified vehicles, each of the plurality of bushings includes an outer housing, an inner housing, and a damping portion extending between the outer housing and the inner housing.

In a further non-limiting embodiment of any of the foregoing electrified vehicles, the damping portion includes rubber.

In a further non-limiting embodiment of any of the foregoing electrified vehicles, the mounting system includes a second isolator assembly comprising a second beam and a second plurality of bushings mounted within the second beam and connected to either the frame or the battery pack.

In a further non-limiting embodiment of any of the foregoing electrified vehicles, each of the plurality of bushings include a different stiffness.

In a further non-limiting embodiment of any of the foregoing electrified vehicles, a first bushing of the plurality of bushings establishes an interface between the beam and the frame, and a second bushing and a third bushing of the plurality of bushings establish an interface between the beam and the battery pack.

In a further non-limiting embodiment of any of the foregoing electrified vehicles, a first bushing and a second bushing of the plurality of bushings establish an interface between the beam and the frame, and a third bushing of the plurality of bushings establishes an interface between the beam and the battery pack.

In a further non-limiting embodiment of any of the foregoing electrified vehicles, the electrified vehicle is a battery electric pickup truck.

A method according to another exemplary aspect of the present disclosure includes, among other things, mounting a battery pack to a frame of an electrified vehicle with a mounting system. The mounting system includes an isolator assembly having a beam and a first bushing, a second bushing, and a third bushing mounted within the beam and connected to either the frame or the battery pack.

In a further non-limiting embodiment of the foregoing method, mounting the battery pack includes inserting a first fastener through a bracket of the frame and through the first bushing of the isolator assembly.

In a further non-limiting embodiment of either of the foregoing methods, mounting the battery pack includes inserting a second fastener through the second bushing and into the battery pack.

In a further non-limiting embodiment of any of the foregoing methods, mounting the battery pack includes inserting a third fastener through the third bushing and into the battery pack.

In a further non-limiting embodiment of any of the foregoing methods, the mounting system includes a second isolator assembly having a second beam and a plurality of bushings mounted within the second beam and connected to either the frame or the battery pack.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details mounting systems and associated methods for mounting a battery pack to an electrified vehicle. An exemplary electrified vehicle may include a frame, a battery pack, and a mounting system for mounting the battery pack to the frame. The mounting system may include one or more isolator assemblies for substantially isolating the battery pack from vehicle loads that may be imparted onto the frame. Each isolator assembly may include a beam and multiple bushings mounted within the beam and connected to either the frame or the battery pack. These and other features are discussed in greater detail in the following paragraphs of this detailed description.

Figure 1:
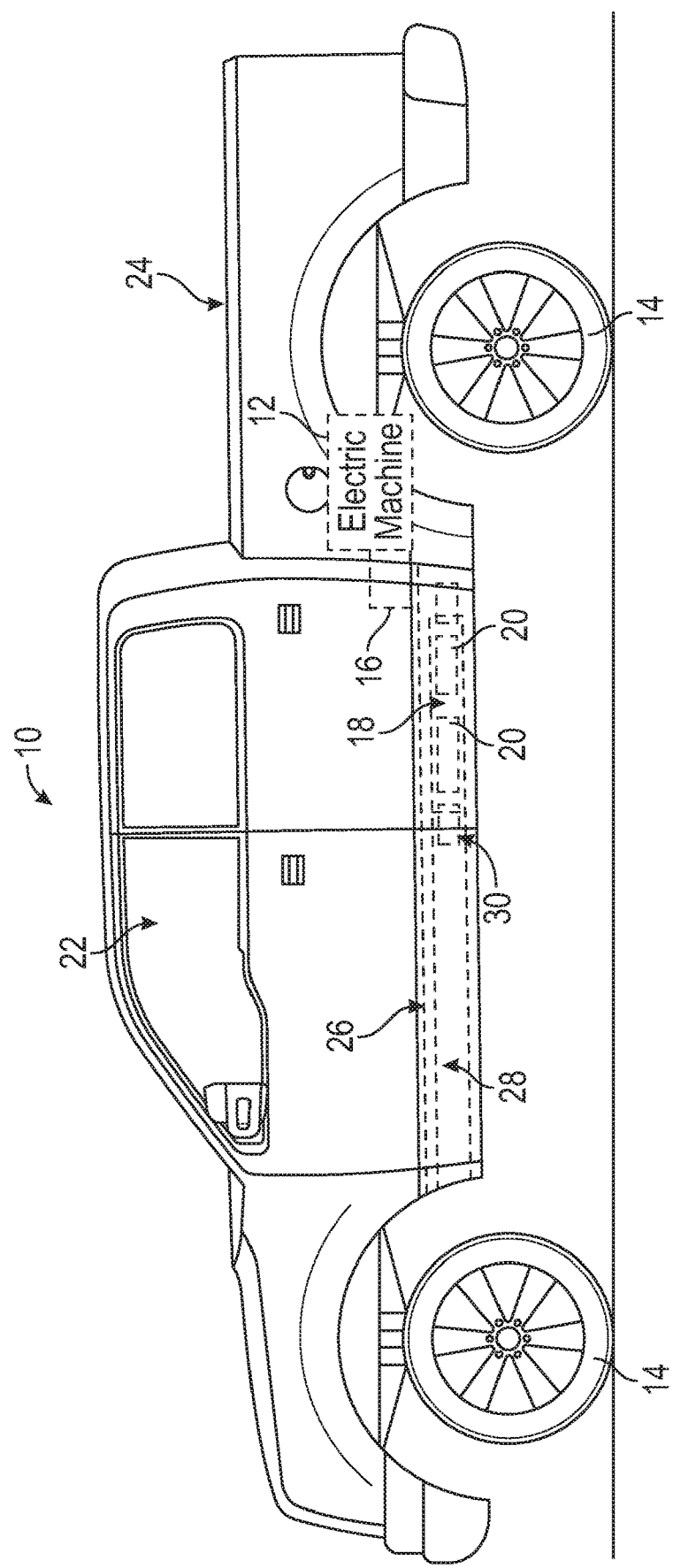
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14 of the electrified vehicle 10.

A voltage bus 16 electrically connects the electric machine 12 to a battery pack 18. The battery pack 18 is an exemplary electrified vehicle battery. The battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

In an embodiment, the electrified vehicle 10 is a pickup truck. However, the electrified vehicle 10 could also be a car, a van, a sport utility vehicle, or any other type of vehicle.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to show certain details of a particular component.

The battery pack 18 may be mounted at various locations of the electrified vehicle 10. In an embodiment, the electrified vehicle 10 includes a passenger cabin 22 and a cargo space 24 (e.g., a truck bed) located to the rear of the passenger cabin 22. A floor pan 26 may separate the passenger cabin 22 from a vehicle frame 28, which generally establishes the vehicle underbody. The battery pack 18 may be suspended from or otherwise mounted to the vehicle frame 28 such that it is remote from both the passenger cabin 22 and the cargo space 24. The battery pack 18 therefore does not occupy space that would otherwise be available for carrying passengers or cargo.

Due to its underbody mounting location, the battery pack 18 may be susceptible to various vehicle loads including, but not limited to, impact loads (e.g., loads imparted during collisions and running clearance events, for example), durability loads, and noise, vibration, and harshness (NVH) loads. Under normal driving events, including off road driving events, the vehicle frame 28 can experience torsion and bending loads which may be transferred into the battery pack 18 if the battery pack 18 is not isolated from these loads. In addition to primary torsion and bending, the vehicle frame 28 can also amplify the dynamic loads during resonant modes of the vehicle frame 28, which could also be transferred directly into the battery pack 18 if not isolated. Under some loads, the vehicle frame 28 can generate up to 10 g's of dynamic acceleration, which could, in turn, generate large forces which can be damaging to the relatively sensitive internal components of the battery pack 18.

Novel mounting systems 30 for mounting the battery pack 18 to the electrified vehicle 10 are therefore proposed in this disclosure. As discussed in greater detail below, the mounting systems 30 are capable of reducing physical displacement of the battery pack 18 and isolating the battery pack 18 from the various loads that may be imparted onto the vehicle frame 28 during vehicle operation.

Figure 2:
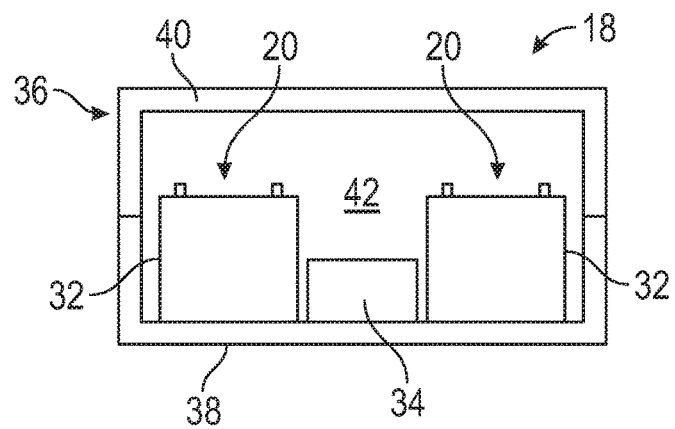
FIG. 2 illustrates an exemplary battery pack of an electrified vehicle.

FIG. 2 is a cross-sectional view of the battery pack 18 of FIG. 1. The battery pack 18 may house a plurality of battery cells 32 that store energy for powering various electrical loads of the electrified vehicle 10, such as the electric machine 12 of FIG. 1, for example. In an embodiment, the battery pack 18 houses prismatic, lithium-ion battery cells. However, battery cells having other geometries (cylindrical, pouch, etc.), other chemistries (nickel-metal hydride, lead-acid, etc.), or both could alternatively be utilized within the scope of this disclosure.

The battery pack 18 may additionally house one or more battery electronic components 34. The battery electronic component 34 could include a bussed electrical center (BEC), a battery electric control module (BECM), wiring harnesses, wiring loops, I/O connectors etc., or any combination of these battery electronic components.

The battery cells 32 may be grouped together in one or more battery arrays 20. In an embodiment, the battery pack 18 includes two battery arrays 20. However, the total numbers of battery cells 32 and battery arrays 20 employed within the battery pack 18 are not intended to limit this disclosure.

An enclosure assembly 36 may house each battery array 20 and battery electronic component 34 of the battery pack 18. Since the battery arrays 20 and the battery electronic components 34 are housed inside the enclosure assembly 36, these components are considered battery internal components of the battery pack 18. Although an example placement of the battery array 20 and the battery electronic components 34 is shown in FIG. 2, this particular placement is not intended to limit this disclosure. The battery internal components of the battery pack 18 can be arranged in any configuration inside the enclosure assembly 36.

In an embodiment, the enclosure assembly 36 is a sealed enclosure. The enclosure assembly 36 may include any size, shape, and configuration within the scope of this disclosure.

The enclosure assembly 36 may include a tray 38 and a cover 40. The tray 38 and the cover 40 cooperate to surround and enclose the battery arrays 20 and the battery electronic components 34. The tray 38 may provide an open area 42 for holding the battery arrays 20 and the battery electronic components 34. After positioning the battery arrays 20 and the battery electronic components 34 within the open area 42, the cover 40 may be seated and sealed to the tray 38 to enclose the battery arrays 20 and the battery electronic components 34.

In an embodiment, the enclosure assembly 36 is a metallic-based component. For example, the tray 38 and the cover 40 could be constructed out of aluminum or steel.

In another embodiment, the enclosure assembly 36 is a polymer-based component. For example, the tray 38 and the cover 40 could be constructed (e.g., molded) of expanded polymer-based materials, solid polymer-based materials, or a combination of such materials. Exemplary expanded polymer-based materials can include, but are not limited to, expanded polypropylene, expanded polystyrene, and expanded polyethylene. Exemplary solid polymer-based materials can include, but are not limited to, sheet moulding compounds (e.g., glass-fiber reinforced polyester), polypropylene, and polyamine.

In yet another embodiment, the enclosure assembly 36 could be constructed of both metallic-based and polymer-based components. For example, the tray 38 could be a metallic-based component and the cover 40 could be a polymer-based component. Other configurations are also contemplated within the scope of this disclosure.

Figure 3:
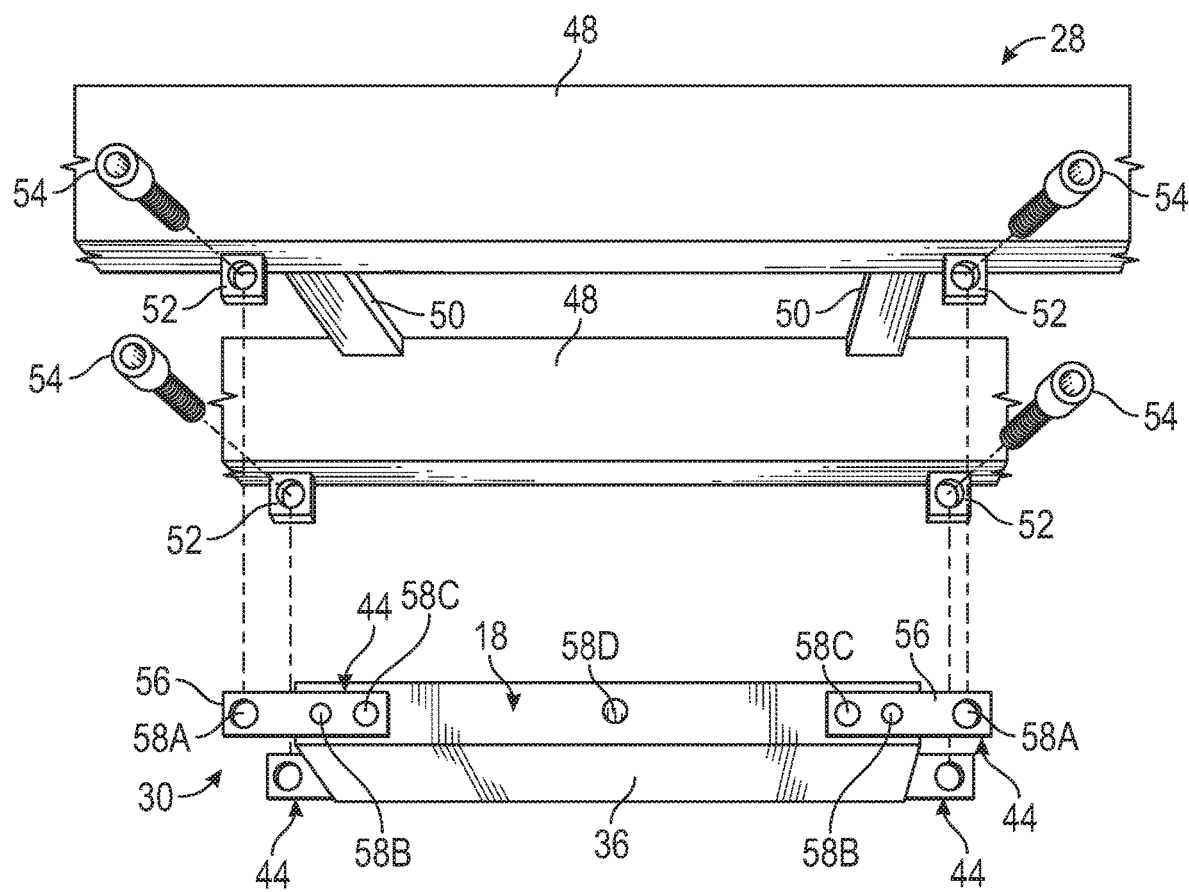
FIG. 3 illustrates a battery pack mounting system for mounting a battery pack to an electrified vehicle.
Figure 4:
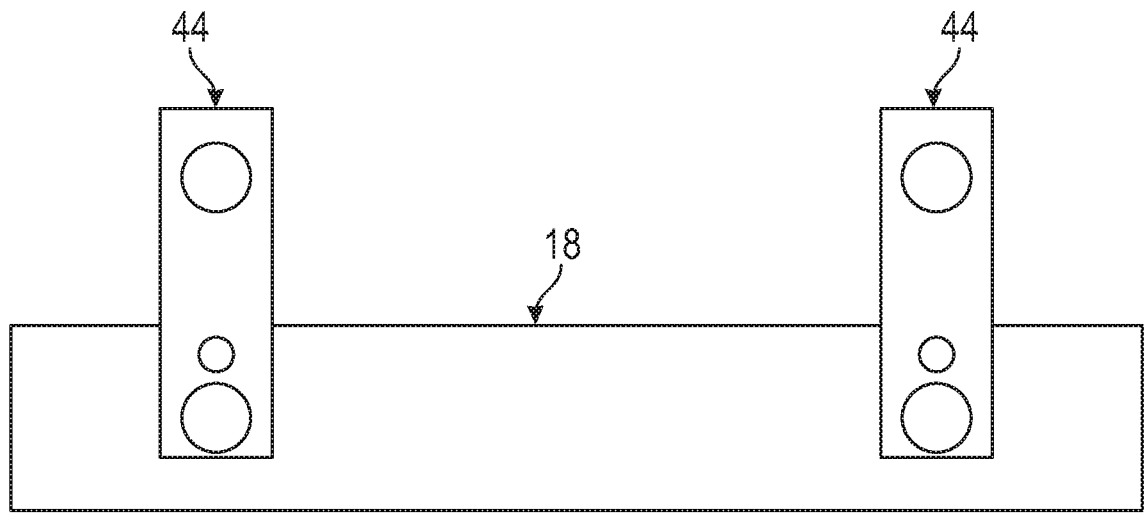
FIG. 4 illustrates another exemplary mounting system for mounting a battery pack to an electrified vehicle.
Figure 5:
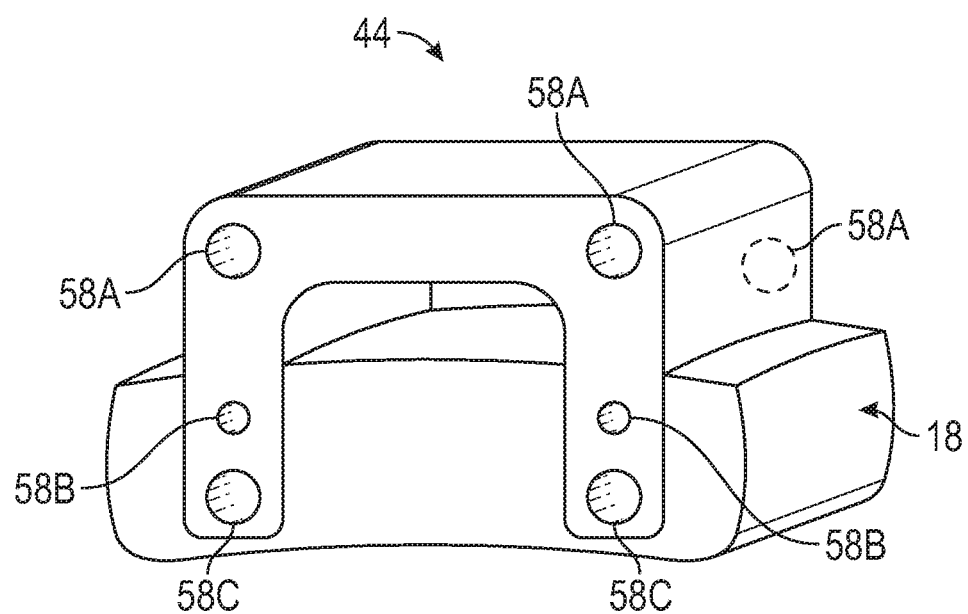
FIG. 5 illustrates yet another exemplary mounting system for mounting a battery pack to an electrified vehicle.

FIG. 3 (with continued reference to FIG. 1) illustrates an exemplary mounting system 30 for mounting the battery pack 18 to the vehicle frame 28. The mounting system 30 may include one or more isolator assemblies 44 for reducing displacement and isolating the battery pack 18 from loads imparted onto the vehicle frame 28 during operation of the electrified vehicle 10. In an embodiment, the mounting system 30 includes four isolator assemblies 44, with one isolator assembly 44 mounted near each corner 46 of the battery pack 18. Other configurations are also contemplated. For example, in another embodiment, the mounting system 30 includes two isolator assemblies 44, with one isolator assembly 44 mounted on each opposing end of the battery pack 18 (see FIG. 4). In yet another embodiment, the mounting system 30 includes a single isolator assembly 44 mounted to the battery pack 18 (see FIG. 5). Thus, the total number and mounting locations of the isolator assemblies 44 are not intended to limit this disclosure.

The vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle are integrated into one another, or may be part of a body-on-frame construction. The vehicle frame 28 may be made of a metallic material, such as steel, carbon steel, or an aluminum alloy, as non-limiting examples.

The vehicle frame 28 includes a plurality of rails 48 (sometimes referred to as "frame rails" or "beams"). FIG. 3 shows two such rails 48. The rails 48 are spaced apart from one another and extend longitudinally to establish a length of the vehicle frame 28. A plurality of cross members 50 may extend between the rails 48 of the vehicle frame 28. The cross members 50 may generally extend transversely relative to the rails 48 for establishing a width of the vehicle frame 28.

The rails 48, the cross members 50, or both may include brackets 52 for accommodating the isolator assemblies 44 of the mounting system 30. In an embodiment, the brackets 52 are U-shaped brackets that are each designed to accommodate one of the isolator assemblies 44. However, other configurations are also contemplated within the scope of this disclosure.

A plurality of fasteners 54 of the mounting system 30 may be used to fixedly mount the isolator assemblies 44 to the vehicle frame 28. In this way, the battery pack 18 may be secured without being hard mounted to the vehicle frame 28. The fasteners 54 may be relatively rigid bolts or screws. Other rigid fasteners could also be used within the scope of this disclosure.

In a mounted position of the battery pack 18, the battery pack 18 is at least partially between the rails 48 of the vehicle frame 28 but is not mechanically coupled to the vehicle frame 28. Rather, the battery pack 18 is mechanically decoupled from the vehicle frame 28. In this disclosure, the term "mechanically coupled" means fixedly connected, whereas the term "mechanically decoupled" denotes an absence of any direct fixed connection such that the vehicle frame 28 and the mounting system 30 substantially absorb any momentum during vehicle loading events rather than the battery pack 18.

Figure 6:
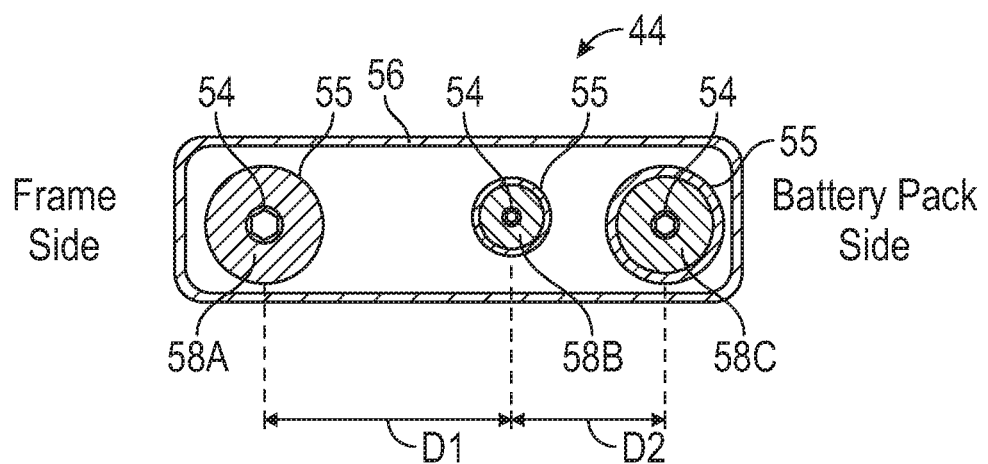
FIG. 6 illustrates an isolator assembly of a battery pack mounting system.

Referring now primarily to FIGS. 3 and 6, each isolator assembly 44 may include a beam 56 and a multitude of bushings 58 mounted within the beam 56. The bushings 58 may be received within openings 55 formed in the beam 56. The total number of bushings 58 of each isolator assembly 44 could vary per vehicle design. In an embodiment, each isolator assembly 44 includes at least three bushings (indicated as features 58A, 58B, and 58C). Where used alone in this disclosure, reference number "58" may refer to any of the bushings 58A, 58B, 58C. In general, it may be desirable to avoid using less than three bushings 58 in order to avoid coupled moments within the isolator assembly 44. If desirable to avoid the coupled moments, due to the bushing layout or packaging constraints, the isolator assemblies 44 may include a non-traditional bushing geometry and attachment scheme that is capable of managing the dynamic forces and moments acting on the isolator assembly 44 and the battery pack 18.

The beam 56 may be a relatively rigid lever that can support the battery pack 18 in its mounted position relative to the vehicle frame 28 of the electrified vehicle 10. In an embodiment, the beam 56 is a metallic lever. In another embodiment, the beam 56 is a plastic lever. Any relatively rigid material can be utilized to construct the beam 56 of the isolator assembly 44.

Figure 7:
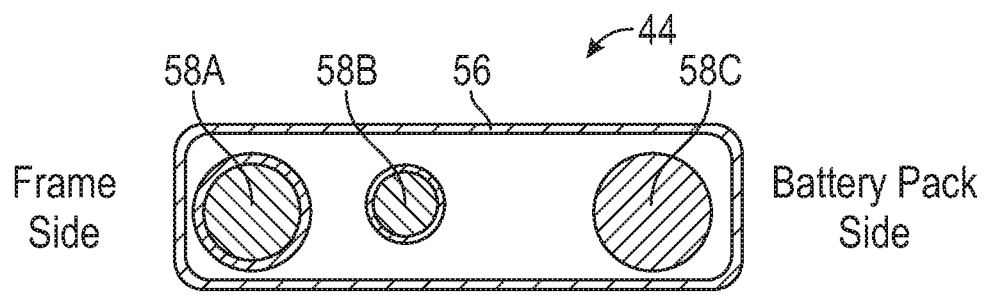
FIG. 7 illustrates another exemplary isolator assembly of a battery pack mounting system.

Together, the beam 56 and the bushings 58 act as a mini subsystem to reduce any physical displacement experienced by the battery pack 18 in response to vehicle loading events. The bushings 58 are also configured to dampen energy that is transmitted from the vehicle frame 28. Stated another way, the bushings 58 act as points of isolation for isolating the battery pack 18 from vibrations and other high acceleration loads that may act on the vehicle frame 28. In an embodiment, the bushing 58A (e.g., a first bushing) establishes a first isolation point between the beam 56 and the bracket 52 of the vehicle frame 28, and the bushings 58B (e.g., a second bushing) and 58C (e.g., a third bushing) establish isolation points between the beam 56 and the battery pack 18. Thus, in this example, a single bushing 58A establishes a first interface between the beam 56 and the vehicle frame 28 and two bushings 58B, 58C establish a second interface between the beam 56 and the battery pack 18. Other configurations are also contemplated. For example, as shown in FIG. 7, two bushings 58A, 58B may establish the first interface between the beam 56 and the vehicle frame 28 and a single bushing 58C may establish the second interface between the beam 56 and the battery pack 18. The actual configuration of the bushings 58 of each isolator assembly 44 may be tuned to address the specific vehicle load isolation requirements.

Referring again to FIG. 6, the bushings 58B, 58C may permit relative motion to occur between the beam 56 and the battery pack 18. For example, the bushings 58B, 58C may allow the battery pack 18 to move slightly in multiple degrees of freedom relative to the beam 56 to allow the beam to work as a lever, thereby minimizing the forces acting on the battery pack 18. This lever action of the beam 56 combined with the flexible bushings 58B-58C is effective to isolate the battery pack 18 by minimizing the forces due to static deflection of the vehicle frame 28 and dynamic forces transmitted from the vehicle frame 28.

In an embodiment, each of the bushings 58A, 58B, and 58C may include a stiffness that is different from the stiffness of the other bushings 58A, 58B, 58C. The specific stiffness of each bushing 58A, 58B, and 58C may be tuned to address any specific vehicle load isolation requirements.

In another embodiment, the diameter of the bushing 58A is larger than the diameter of the bushing 58C, and the diameter of the bushing 58C is larger than the diameter of the bushing 58B. In addition, the bushing 58B may be mounted within the beam 56 at a first distance D1 from the bushing 58A, and the bushing 58C may be mounted within the beam 56 at a second distance D2 from the bushing 58B. In an embodiment, the second distance is about half the distance of the first distance D1. The size of each bushing 58A, 58B, and 58C and the distances between the bushings 58A, 58B, and 58C can be specifically designed to create an articulating arm. In this way, the forces acting on the beam 56 from the vehicle frame 28 are reduced, managed, and/or absorbed at the bushings 58A, 58B, and 58C across the length of the rigid beam 56. Utilizing the isolator assembly 44 as an articulating arm, in which the motion and dynamic response is managed by the stiffness variations of the bushings 58A-58C, allows the isolator assembly 44 to take advantage of the core concept of a lever mechanism to reduce the resulting force. In addition to the force management, the lever mechanism allows the isolator assembly 44 to have large input displacements on the bushing 58C, which translates to low displacement behavior on the bushings 58A and 58B. The unique layout of the bushing positions and stiffness' enables the isolator assembly 44 to reduce the vehicle frame 28 forces into the battery pack 18

The isolator assemblies 44 may be connected to the battery pack 18 and to the vehicle frame 28 using the fasteners 54. The total number of fasteners 54 employed by the mounting system 30 may vary per design and is therefore not intended to limit this disclosure. A first fastener 54 may extend through the bracket 52 of the vehicle frame 28 and through the bushing 58A to mount each isolator assembly 44 to the vehicle frame 28. In addition, a second fastener 54 may extend through the beam 56 and the bushing 58B and then into the battery pack 18 and a third fastener 54 may extend through the beam 56 and the bushing 58C and then into the battery pack 18 in order to securely mount each isolator assembly 44 to the battery pack 18.

The mounting system 30 may optionally include an additional bushing 58D (see FIG. 3) mounted within the enclosure assembly 36 of the battery pack 18. In an embodiment, the bushing 58D is mounted near a nodal point of the battery pack 18. A bracket (not shown) may connect between the bushing 58D and the vehicle frame 28. The bushing 58D may provide additional motion control of the battery pack 18 once mounted relative to the vehicle frame 28.

Figure 8:
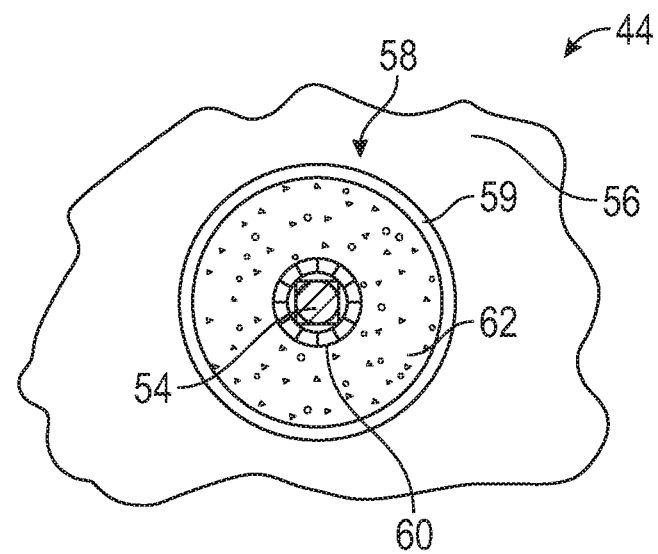
FIG. 8 illustrates an exemplary bushing of an isolator assembly.

FIG. 8, with continued reference to FIGS. 3-7, illustrates an exemplary bushing 58 that can be used within the mounting system 30 for dampening vehicle loads, thereby preventing such loads from imparting into the battery pack 18. The bushing 58 of FIG. 8 is representative of any of the bushings 58A-58D described above.

The exemplary bushing 58 may include an outer housing 59, an inner housing 60, and a damping portion 62 generally between the outer housing 59 and the inner housing 60. The damping portion 62 secures the outer housing 59 to the inner housing 60. The inner housing 60 may be substantially cylindrical and receives a shaft of the fastener 54 for securing each isolator assembly 44 to either the vehicle frame 28 or the battery pack 18 (see, for example, FIG. 3). The outer housing 59 may be concentric with the inner housing 60.

The damping portion 62 may be, for example, a high-carbon rubber that is both elastomeric and, optionally, electrically conductive. In other examples, the damping portion 62 is not electrically conductive. The damping portion 62 could be made of other elastomeric materials, including, ethylene propylene diene monomer (EPDM) rubber, natural rubber, butyl rubber, polyurethane, silicones, metal-filled silicones, etc. The damping portion 62 is compressible relative to the outer housing 59 and the inner housing 60, by way of the elastomeric material, which permits the outer housing 59 to move and flex relative to the inner housing 60. While one exemplary bushing 58 has been described, this disclosure extends to other bushing configurations. Additionally, if needed to achieve the desired target, the bushing selection may include a hydraulically damped high-carbon rubber, which can include but is not limited to exhibiting amplitude and frequency dependent stiffness with significantly increased damping properties.

The exemplary battery pack mounting systems of this disclosure provide unique mounting solutions for minimizing the strain energy into the high voltage battery pack by reducing the interaction of the supporting structure displacement and reducing the static and dynamic loads which may be generated on vehicles having relatively severe durability duty cycles. The mounting systems minimize the structural interaction between the battery pack and its supporting structure, thereby requiring minimal hardware changes for incorporating battery packs across multiple vehicle architectures.

Although the different non-limiting embodiments are illustrated as having specific components or steps, the embodiments of this disclosure are not limited to those particular combinations. It is possible to use some of the components or features from any of the non-limiting

What is claimed is:

1. An electrified vehicle, comprising:
   a frame;
   a battery pack; and
   a mounting system for mounting the battery pack to the frame, wherein the mounting system includes a first isolator assembly including a first beam and a first plurality of bushings mounted within the first beam and connected to either the frame or the battery pack, and a second isolator assembly including a second beam and a second plurality of bushings mounted within the second beam and connected to either the frame or the battery pack,
   wherein the first plurality of bushings and the second plurality of bushings each include at least three bushings.

2. The electrified vehicle as recited in claim 1, wherein the frame includes a first rail, a second rail, and a cross member extending between the first rail and the second rail, and the battery pack is at least partially between the first rail and the second rail.

3. The electrified vehicle as recited in claim 2, comprising a bracket extending from the first rail, the second rail, or the cross member, and the first isolator assembly is received by the bracket.

4. The electrified vehicle as recited in claim 3, comprising a fastener extending through the bracket and through one of the first plurality of bushings to secure the battery pack relative to the frame.

5. The electrified vehicle as recited in claim 1, wherein the first plurality of bushings include a first bushing, a second bushing, and a third bushing.

6. The electrified vehicle as recited in claim 5, wherein a first fastener extends through the first bushing and then into the frame, a second fastener extends through the second bushing and then into the battery pack, and a third fastener extends through the third bushing and then into the battery pack.

7. The electrified vehicle as recited in claim 5, wherein the second bushing is positioned at a first distance from the first bushing, and the third bushing is positioned at a second distance from the second bushing, and the second distance is half of the first distance.

8. The electrified vehicle as recited in claim 1, wherein the first beam is a rigid lever.

9. The electrified vehicle as recited in claim 1, wherein each of the first plurality of bushings includes an outer housing, an inner housing, and a damping portion extending between the outer housing and the inner housing.

10. The electrified vehicle as recited in claim 9, wherein the damping portion includes rubber.

11. The electrified vehicle as recited in claim 1, wherein each of the first plurality of bushings includes a different stiffness.

12. The electrified vehicle as recited in claim 1, wherein the electrified vehicle is a battery electric pickup truck.

13. An electrified vehicle, comprising:
    a frame;
    a battery pack; and
    a mounting system for mounting the battery pack to the frame, wherein the mounting system includes an isolator assembly including a beam and a plurality of bushings mounted within the beam and connected to either the frame or the battery pack,
    wherein a first bushing of the plurality of bushings establishes an interface between the beam and the frame, and a second bushing and a third bushing of the plurality of bushings establish an interface between the beam and the battery pack.

14. An electrified vehicle, comprising:
    a frame;
    a battery pack; and
    a mounting system for mounting the battery pack to the frame, wherein the mounting system includes an isolator assembly including a beam and a plurality of bushings mounted within the beam and connected to either the frame or the battery pack,
    wherein a first bushing and a second bushing of the plurality of bushings establish an interface between the beam and the frame, and a third bushing of the plurality of bushings establishes an interface between the beam and the battery pack.

15. A method, comprising:
    mounting a battery pack to a frame of an electrified vehicle with a mounting system, wherein the mounting system includes a first isolator assembly comprising a first beam and a first bushing, a second bushing, and a third bushing mounted within the first beam and connected to either the frame or the battery pack, and a second isolator assembly comprising a second beam and a fourth bushing, a fifth bushing, and a sixth bushing mounted within the second beam and connected to either the frame or the battery pack.

16. The method as recited in claim 15, wherein mounting the battery pack includes:
    inserting a first fastener through a bracket of the frame and through the first bushing of the first isolator assembly.

17. The method as recited in claim 16, wherein mounting the battery pack includes:
    inserting a second fastener through the second bushing and into the battery pack.

18. The method as recited in claim 17, wherein mounting the battery pack includes:
    inserting a third fastener through the third bushing and into the battery pack.

* * * * *